(No Model.)

G. B. BOOMER.
DEFECATING SACCHARINE LIQUIDS.

No. 293,409. Patented Feb. 12, 1884.

WITNESSES:
Chas. Wahlers.
William Miller

INVENTOR
George B. Boomer
BY Van Santvoord & Hauff
ATTORNEYS

UNITED STATES PATENT OFFICE.

GEORGE B. BOOMER, OF TARRYTOWN, NEW YORK.

DEFECATING SACCHARINE LIQUIDS.

SPECIFICATION forming part of Letters Patent No. 293,409, dated February 12, 1884.

Application filed July 12, 1883. (No model.)

*To all whom it may concern:*

Be it known that I, GEORGE B. BOOMER, a citizen of the United States, residing at Tarrytown, in the county of Westchester and State of New York, have invented new and useful Improvements in Defecating Saccharine Liquids, of which the following is a specification.

This invention relates to the defecation of cane-juice and other saccharine liquids; and it consists in the novel process and apparatus hereinafter described, whereby the impurities are eliminated from the liquid in a superior and economical manner.

Figure 1:
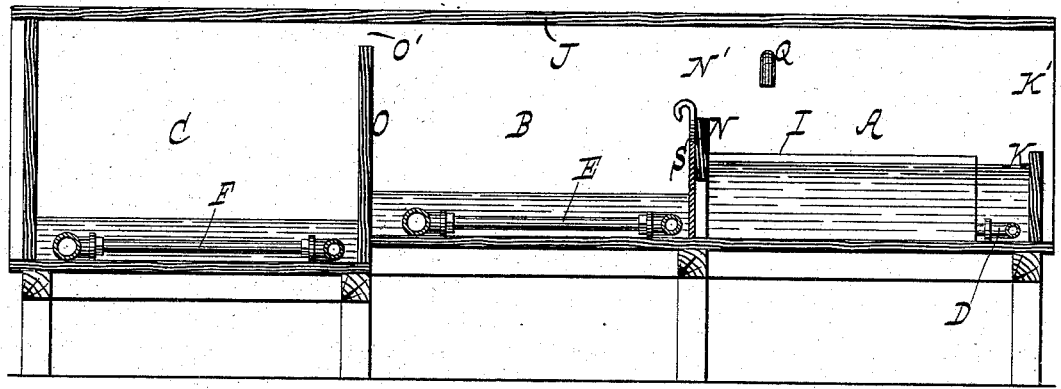
Figure 2:
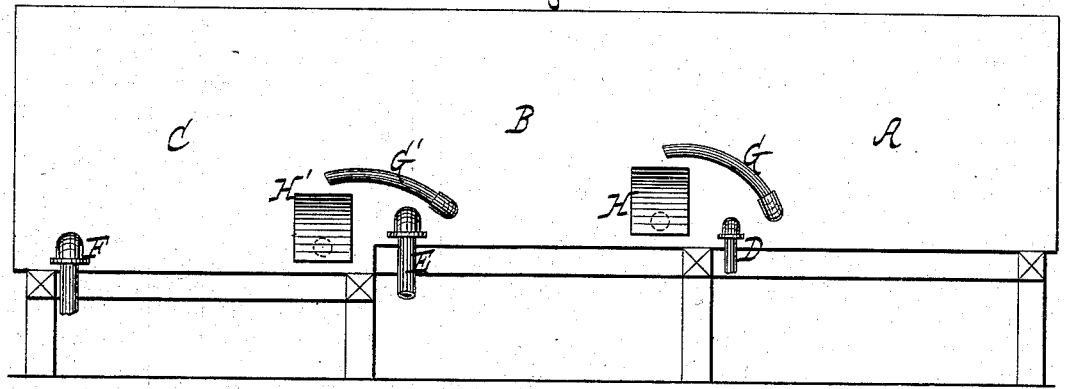

In the accompanying drawings, which illustrate the apparatus used in carrying out my invention, Figure 1 represents a longitudinal section; Fig. 2, a side elevation, and Fig. 3 a horizontal section.

Similar letters indicate corresponding parts.

Figure 3:
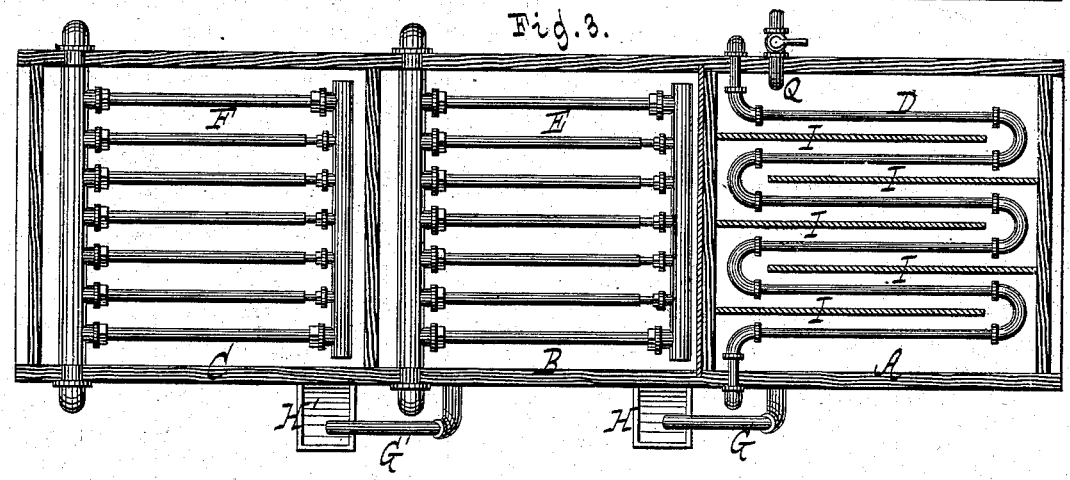

The letters A B C designate three vessels concomitant to the apparatus, such vessels being arranged in a row or train, and provided, respectively, with a heating medium, consisting in this example of a coil, D, E, or F, adapted to be supplied with steam. To one side of the first vessel, A, is connected an overflow-spout, G, which swings on its joint with the vessel, and thus is adjustable as to the height of its outlet, which also determines the height of the liquid in the vessel, while to the corresponding side of the second vessel, B, is connected a pocket, H, which is adapted to receive the liquid discharging from the spout, and to deliver such liquid to the second vessel. The point at which the discharge-spout G is connected to the vessel A is intermediate of the top and bottom of the vessel. Within the first vessel, A, are arranged a series of longitudinal partitions, I, which terminate alternately near the opposite ends of such vessel, they being placed between the pipes composing the coil D, when such is used, and by these partitions the vessel is subdivided to form a circuitous channel extending throughout the vessel, as shown in Fig. 3. To corresponding sides of the second and third vessels, B C, respectively, is connected a spout, G', and pocket H', similar to the spout G and pocket H.

On the vessels A B C is fitted a cover, J, which is put in place when the apparatus is in operation, so as to close the vessels at the top, and the partition-walls N O, whereby the vessels are divided from each other, as well as the end wall, K, of the first vessel, terminate below such top, leaving spaces N' O' K' above them for the escape of steam, &c., the first partition-wall, N, being higher than said end wall, while the second partition-wall, O, is higher than the first one.

Intermediate of the first and second vessels, A B, is arranged a gate, S, through which the liquid in the first vessel may be allowed to flow in a body into the second vessel, and, if desired, a similar gate may be arranged between the second and third vessel.

In carrying out my invention I introduce the liquid into the first vessel, A, in a steady stream and heat the same therein to about 210° Fahrenheit without allowing it to boil. When the liquid reaches the proper depth in said first vessel, it overflows through the spout G into the pocket H, and thence enters the second vessel, B, wherein I heat the same to the boiling-point, and by the heat to which the liquid is exposed in the first vessel the impurities are eliminated therefrom without danger of coagulation and precipitation, while by the heat to which the liquid is exposed in the second vessel any impurities that may have been left therein in the first vessel are thrown off to complete the defecation.

This process can be used with special advantage in the treatment of cane-juice, due to the fact that such liquid possesses a large amount of albuminous compounds and other impurities, some of which are coagulated and precipitated if the liquid is allowed to boil.

The third vessel, C, is used mainly to increase the capacity of the apparatus, and may, if desired, be omitted, a pressure of steam—say from seventy-five to eighty pounds—being maintained in its coil, and it being similar in operation to the second vessel, and from either the second or third vessel the liquid is conveyed to an evaporator, wherein it is brought to the required density.

The liquid is admitted to the first or receiving vessel, A, as through a pipe, Q, at a point opposite to that at which the steam enters the coil D of this vessel, whence the liquid flows through the circuitous channel formed by the partitions I, and inasmuch as the liquid thus takes a course directly opposite to that of the entering steam, it is exposed to a gradually-increasing heat. The overflow-spouts G G' should be so adjusted that the liquid in the first vessel, A, is at a depth of about six inches, and in the second vessel, B, at a depth of about two and a half inches, although these proportions may be varied. The mouth of the spouts G G' and the ensuing level of the liquid in the vessels A B is always above the juncture of the spouts with the vessels; and due to this fact and the place of such juncture, the spouts take the liquid from the vessels at points intermediate of the top and bottom of the liquid, so that it is left entirely free of the scum floating thereon, as well as of the sediment that may accumulate on the bottom of the vessels. The floating scum escapes from the liquid in the first vessel, A, over the end wall, K, thereof, and from the liquid in the second vessel, B, into the first vessel, over the first partition-wall, N, and inasmuch as the steam generated in the vessels has no other outlet than through the openings N' O' K', such steam sweeps over the surface of the liquid and forces the scum onward over the end wall, K, so that the skimming of the liquid is entirely automatic, and the danger of throwing off any liquid with the scum is avoided. It will be seen that, owing to the relative height of the end wall, K, and partition-walls N O, the scum discharges in the required direction, even if the amount of steam present, as in starting the apparatus, is insufficient to affect the scum.

What I claim as new, and desire to secure by Letters Patent, is—

1. In the process of defecating saccharine liquid by passing it successively through heated vessels, the step herein described, consisting in drawing the liquid from the vessels at a point intermediate of the top and bottom of the liquid, for the purpose of leaving it free of scum and sediment.

2. The combination, substantially as hereinbefore set forth, of the train of vessels, each provided with a heating medium, an overflow-spout connected to one vessel at a point intermediate of the top and bottom, and a delivery-pocket connected to the adjacent vessel for receiving the liquid from the spout.

3. The combination, substantially as hereinbefore described, of the train of vessels, each provided with a heating medium, an overflow-spout adjustably connected to one vessel, and a delivery-pocket connected to the adjacent vessel for receiving the liquid from the spout.

4. The combination, substantially as hereinbefore set forth, of the vessel A, provided with a heating-coil, the vessel B, a means for conveying liquid from one such vessel to the other, and the longitudinal partitions arranged in the first vessel between the pipes composing its coil, such partitions terminating alternately near the opposite ends of the vessel, to form a circuitous channel.

5. The combination, substantially as hereinbefore set forth, of the train of vessels closed at the top and provided with heating mediums, the end wall, K, of the first vessel, and the partition-walls N O, such end and partition walls terminating below the top of the vessels to leave openings for the passage of steam from one vessel to another.

6. The combination, substantially as hereinbefore set forth, of the train of vessels closed at the top and provided with heating mediums, the end wall, K, of the first vessel, and the partition-walls N O, such end and partition walls terminating below the top of the vessels, and gradually increasing in height, for the purpose specified.

In testimony whereof I have hereunto set my hand and seal in the presence of two subscribing witnesses.

GEORGE B. BOOMER. [L. S.]

Witnesses:
J. HERMAN WAHLERS,
CHAS. WAHLERS.